United States Patent
Yun et al.

(10) Patent No.: US 9,325,178 B2
(45) Date of Patent: Apr. 26, 2016

(54) BALANCING APPARATUSES FOR BALANCING CELLS INCLUDED IN BATTERIES AND BATTERY MODULES

(71) Applicant: Samsung Electronics Co., Ltd., Suwon-Si, Gyeonggi-Do (KR)

(72) Inventors: Jae-jung Yun, Hwaseong-si (KR); Jang-pyo Park, Busan (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 198 days.

(21) Appl. No.: 13/957,871

(22) Filed: Aug. 2, 2013

(65) Prior Publication Data

US 2014/0239878 A1 Aug. 28, 2014

(30) Foreign Application Priority Data

Feb. 27, 2013 (KR) ........................ 10-2013-0021395

(51) Int. Cl.
    *H02J 7/00* (2006.01)
(52) U.S. Cl.
    CPC .................................... *H02J 7/0019* (2013.01)
(58) Field of Classification Search
    USPC ........................ 320/116, 118, 107, 128, 134
    See application file for complete search history.

(56) References Cited

U.S. PATENT DOCUMENTS

| | | | |
|---|---|---|---|
| 6,538,414 B1 | 3/2003 | Tsuruga et al. | |
| 8,148,942 B2 | 4/2012 | Densham et al. | |
| 2004/0135544 A1* | 7/2004 | King et al. | 320/116 |
| 2009/0278496 A1* | 11/2009 | Nakao et al. | 320/118 |
| 2010/0225275 A1 | 9/2010 | Bucur et al. | |
| 2012/0086390 A1* | 4/2012 | Lim et al. | 320/107 |
| 2013/0015821 A1* | 1/2013 | Kim et al. | 320/128 |
| 2013/0057198 A1* | 3/2013 | Gerlovin | 320/103 |

FOREIGN PATENT DOCUMENTS

| | | |
|---|---|---|
| KR | 10-0976185 B1 | 8/2010 |
| KR | 20120096396 A | 8/2012 |

* cited by examiner

*Primary Examiner* — Brian Ngo
(74) *Attorney, Agent, or Firm* — Harness, Dickey & Pierce, PLC

(57) ABSTRACT

An apparatus for performing balancing on cells connected in series and included in a module may comprise a first switching unit including first cell selection switches respectively connected to the cells, and configured to connect a first cell to be balanced to a balancing unit; a second switching unit including second cell selection switches respectively connected to the cells, and configured to connect a second cell to be balanced to the balancing unit; a controller configured to measure voltages of each cell, and controlling operations of the first switching unit, the second switching unit, and the balancing unit based on information on the first and second cells, wherein the first and second cells are selected by the controller using the measured voltages; and/or the balancing unit, connected to the first and second switching units, and configured to perform balancing between the first and second cells selected by the controller.

17 Claims, 10 Drawing Sheets

BALANCING APPARATUSES FOR BALANCING CELLS INCLUDED IN BATTERIES AND BATTERY MODULES

CROSS-REFERENCE TO RELATED APPLICATION(S)

This application claims priority from Korean Patent Application No. 10-2013-0021395, filed on Feb. 27, 2013, in the Korean Intellectual Property Office (KIPO), the entire contents of which are incorporated herein by reference.

BACKGROUND

1. Field

Some example embodiments may relate to balancing apparatuses for balancing cells included in batteries and/or battery modules.

2. Description of Related Art

A battery is formed by connecting stacks in parallel, each stack having a plurality of single cells connected serially, in order to achieve a high voltage and large capacity. Ideally, the cells have identical characteristics, but deviations (a difference in capacity, impedance, and the like) occur due to technical or economical limitations in manufacturing the cells. The deviations increase as a temperature difference between cells and the number of times the cells are charged or discharged increases. Since a cell having small capacity gets over-charged or over-discharged due to deviations between cells during charging or discharging, the life span of the cell may be reduced. In addition, the life span of a battery formed of a combination of stacks, each stack being formed of cells connected in series, is determined by the cell having the shortest life span, so the life span of the battery may be also correspondingly reduced. Therefore, to adjust voltages of each of the cells to be the same value, namely, balancing, of the cells is necessary.

As an example of balancing between cells, there is a scheme for transferring energy between a module and a cell by using a multiple wound transformer. When energy is transferred from a cell of a high voltage to a cell of a low voltage according to this scheme, the energy is transferred from the high voltage cell to the module via a balancing circuit, and the energy is then transferred from the module to the low voltage cell via the balancing circuit. That is, when energy is transferred from the high voltage cell to the low voltage cell, the energy passes through the balancing circuit twice, thereby causing unnecessary energy consumption. In addition, since a transformer has windings on a single core and a single bobbin equal to the number of cells, a transformer design becomes more difficult and a size of a balancing circuit becomes larger, as the number of cells gets larger.

SUMMARY

Some example embodiments may provide balancing methods, balancing apparatuses, and/or balancing modules for reducing voltage differences among cells.

In some example embodiments, an apparatus for performing balancing on a plurality of cells connected in series and included in a module may comprise a first switching unit including first cell selection switches respectively connected to cells of the plurality of cells, and configured to connect a first cell to be balanced to a balancing unit; a second switching unit including second cell selection switches respectively connected to cells of the plurality of cells, and configured to connect a second cell to be balanced to the balancing unit; a controller configured to measure voltages of each of the plurality of cells, and controlling operations of the first switching unit, the second switching unit, and the balancing unit based on information on the first and second cells, wherein the first and second cells are selected by the controller by using the measured voltages; and/or the balancing unit, connected to the first switching unit and the second switching unit, and configured to perform balancing between the first cell and the second cell that are selected by the controller.

In some example embodiments, a number of the plurality of cells may be N. The balancing unit may include at least one but no more than N forward converters.

In some example embodiments, each of the forward converters may comprise bidirectional switches connected to the first switching unit and the second switching unit, configured to control currents flowing between the first switching unit, the second switching unit, and multiple wound transformers; the multiple wound transformers connected to the bidirectional switches, and configured to transfer energy between the first cell and the second cell; and/or a reset circuit connected to both ends of the module, and including a mutual inductor correlated with the multiple wound transformers and a diode.

In some example embodiments, each of the multiple wound transformers may comprise two mutual inductors having a same number of windings.

In some example embodiments, each of the forward converters may be configured to allow a capacitor included in one of the bidirectional switches and an inductor included in one of the multiple wound transformers to form resonance.

In some example embodiments, a capacitor included in the one of the bidirectional switches and an inductor included in one of the multiple wound transformers may be configured to have a voltage between both ends of the one of the bidirectional switches or a current flowing through the one of the bidirectional switches having a minimum value when the one of the bidirectional switches is turned on or off.

In some example embodiments, the first cell and the second cell may respectively have highest and lowest voltages from among the plurality of cells.

In some example embodiments, the controller may be configured to control the first switching unit, the second switching unit, and the balancing unit to turn on the first and second cell selection switches respectively connected to the first and second cells and, then, repeatedly turn on and turn off the bidirectional switches in the balancing unit so as to perform the balancing, and to turn off the first and second cell selection switches respectively connected to the first and second cells after turning off the bidirectional switches so as to complete the balancing.

In some example embodiments, when the balancing unit comprises M forward converters, the M forward converters may be connected in parallel. A first forward converter may perform the balancing between a cell having a highest voltage and a cell having a lowest voltage of the plurality of cells. A K-th forward converter may perform the balancing between a cell having a K-th highest voltage and a cell having a K-th lowest voltage of the plurality of cells. M may be an integer greater than or equal to 2 but no more than a number of the plurality of cells. K may be an integer greater than or equal to 2 and less than or equal to M.

In some example embodiments, an apparatus for performing balancing on a plurality of cells connected in series and included in a module may comprise two or more balancing sets performing the balancing in parallel on cells in groups of cells into which the plurality of cells are divided. Each of the two or more balancing sets may comprise a first switching unit including first cell selection switches respectively connected to cells included in a first group of cells, and configured to connect a first cell to be balanced, from the first group of cells, to a balancing unit; a second switching unit including second cell selection switches respectively connected to cells included in a second group of cells, and configured to connect a second cell to be balanced, from the second group of cells, to the balancing unit; a controller configured to measure voltages of each of the cells in the first and second groups of cells, and configured to control operations of the first switching unit, the second switching unit, and the balancing unit based on information on the first and second cells, wherein the first and second cells are selected by the controller by using the measured voltages; and/or the balancing unit, connected to the first and second switching units, and configured to perform balancing between the first and second cells that are selected by the controller.

In some example embodiments, a number of the cells in each group of cells connected to each of the balancing sets may be N. The balancing unit may comprise one or more forward converters and N or fewer forward converters.

In some example embodiments, each of the forward converters may comprise bidirectional switches connected to the first switching unit and the second switching unit, configured to control currents flowing between the first switching unit, the second switching unit, and multiple wound transformers; the multiple wound transformers connected to the bidirectional switches, and configured to transfer energy between the first cell and the second cell; and/or a reset circuit connected to both ends of the module, and including a mutual inductor correlated with the multiple wound transformers and a diode.

In some example embodiments, the multiple wound transformers may comprise two mutual inductors having a same number of windings.

In some example embodiments, each of the forward converters may be configured to allow a capacitor included in one of the bidirectional switches and an inductor included in one of the multiple wound transformers to form resonance.

In some example embodiments, a capacitor included in one of the bidirectional switches and an inductor included in one of the multiple wound transformers may be configured to have a voltage between both ends of the one of the bidirectional switches or a current flowing through the one of the bidirectional switches having a minimum value when the one of the bidirectional switches is turned on or off.

In some example embodiments, the first cell and the second cell may respectively have highest and lowest voltages from among the plurality of cells.

In some example embodiments, the controller may be configured to control the first switching unit, the second switching unit, and the balancing unit to turn on the first and second cell selection switches and, then, repeatedly turn on and turn off the bidirectional switches in the balancing unit so as to perform the balancing, and to turn off the first and second cell selection switches after turning off the bidirectional switches so as to complete the balancing.

In some example embodiments, a battery module may comprise a plurality of cells connected in series; and/or a balancing apparatus selecting any two cells from among the plurality of cells, and balancing the selected cells. The balancing apparatus may comprise a first switching unit including first cell selection switches respectively connected to cells of the plurality of cells, and configured to connect a first cell to be balanced to a balancing unit; a second switching unit including second cell selection switches respectively connected to cells of the plurality of cells, and configured to connect a second cell to be balanced to the balancing unit; a controller configured to measure voltages of each of the plurality of cells, and configured to control operations of the first switching unit, the second switching unit, and the balancing unit based on information on the first cell and the second cell, wherein the first cell and the second cell are selected by the controller by using the measured voltages; and/or the balancing unit, connected to the first switching unit and the second switching unit, and configured to perform balancing between the first cell and the second cell that are selected by the controller.

In some example embodiments, when the balancing unit comprises M forward converters, the M forward converters may be connected in parallel. A first forward converter may perform the balancing between a cell having a highest voltage and a cell having a lowest voltage of the plurality of cells. A K-th forward converter may perform the balancing between a cell having a K-th highest voltage and a cell having a K-th lowest voltage of the plurality of cells. M may be an integer greater than or equal to 2 and less than or equal to a number of the plurality of cells. K may be an integer greater than or equal to 2 and less than or equal to M.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
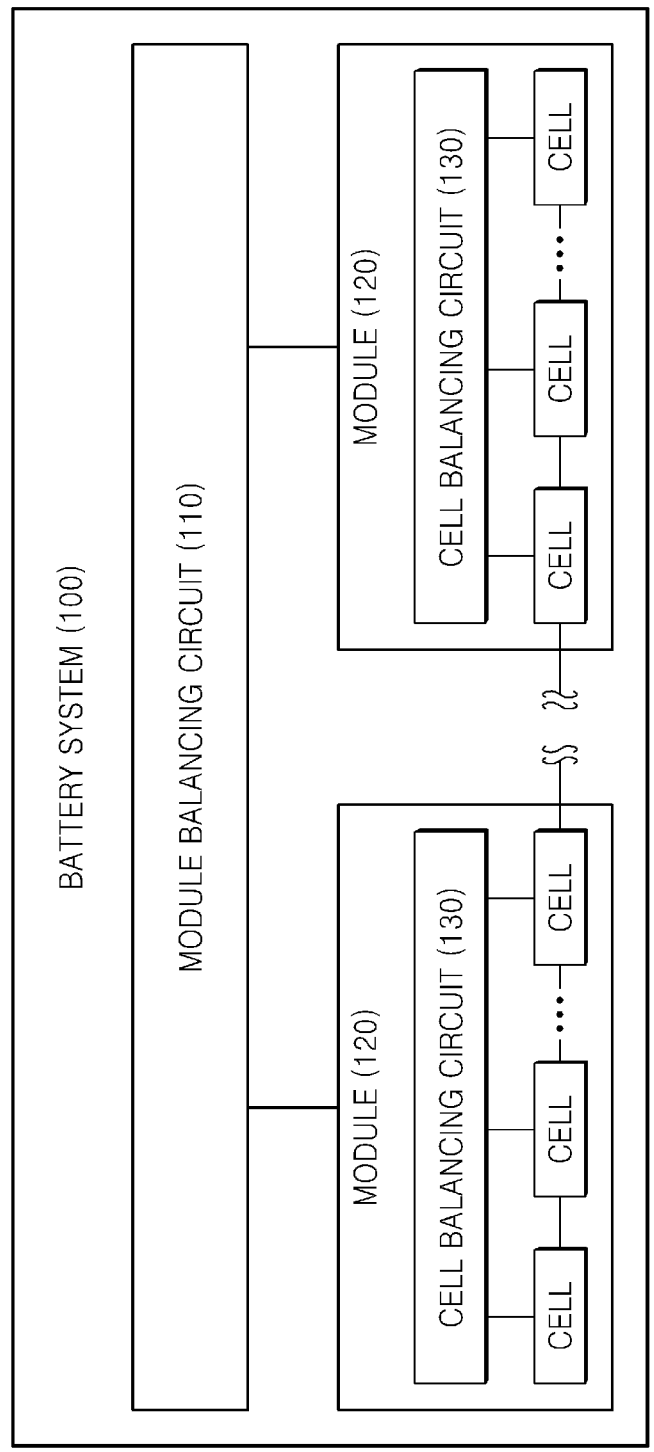
FIG. 1 illustrates an exemplary battery system according to some example embodiments of the present disclosure.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 illustrates an exemplary battery system 100 according to some example embodiments of the present disclosure.

Referring to FIG. 1, the battery system 100 includes a module balancing circuit 110 and a plurality of modules 120. Each of the modules 120 includes a plurality of cells and a cell balancing circuit 130. The plurality of cells store energy, and are reusable by charging. In charging and discharging of the plurality of cells, voltage differences may occur among the plurality of cells included in the battery system 100, and voltage differences may also occur between the modules 120.

The module balancing circuit 110 is connected to the modules 120 included in the battery system 100. At this time, the modules 120 are connected in series. The module balancing circuit 110 performs balancing between modules 120 included in the battery system 100. The module balancing circuit 110 measures voltages of the modules 120, and selects modules 120 to perform balancing on, on the basis of the measured voltages. The module balancing circuit 110 turns a switch (not shown) on or off to perform the balancing on the selected modules 120. For example, the module balancing circuit 110 may operate in the same manner as the cell balancing circuit 130 to be described later. In detail, in the same manner in which the cell balancing circuit 130 performs balancing between two cells, the module balancing circuit 110 may perform balancing between two modules. Accordingly, a detailed description regarding to the cell balancing circuit 130 to be described later may be identically applied to the module balancing circuit 110.

Each of the modules 120 includes a predetermined number of cells and a cell balancing circuit 130. The module 120 includes the predetermined number of cells that a plurality of cells included in the battery system 100 are divided into. The number of cells included in a single module 120 may be determined for efficient cell management.

When voltage differences occur among the cells, the cell balancing circuit 130 performs balancing on cells differing in voltage from one another. In other words, the cell balancing circuit 130 adjusts the voltages of the cells differing in voltage from one another so that their respective voltages coincide with one other. In an ideal case, since the cells have the same characteristics, voltages of the cells when charging and discharging are the same. However, due to technical limitations, capacitances or impedances of the cells may be different from one another. These characteristic differences of the cells may cause overcharging or over-discharging for some of the cells. Accordingly, when the voltage differences between cells occur during charging or discharging, the cell balancing circuit 130 operates to adjust the voltages of the cells differing in voltage from one another so that their respective voltages coincide with one other. For example, the cell balancing circuit 130 transfers energy of a high voltage cell to a low voltage cell and so that the voltages of the two cells are coincided with each other. Alternatively, the cell balancing circuit 130 may perform balancing by rapidly consuming the voltage of the high voltage cell.

The cell balancing circuit 130 periodically measures the voltages of the cells, and performs balancing on cells on the basis of the measured voltages. For example, the cell balancing circuit 130 compares the maximum voltage and the minimum voltage among the measured voltages. When a difference between the maximum voltage and the minimum voltage is greater than a preset threshold value, the cell balancing circuit 130 adjusts the voltages of the cells of the maximum and minimum voltages so that they are coincided with each other.

The battery system 100 in FIG. 1 only shows elements related to some example embodiments. Accordingly, those having an ordinary skill in the art will understand that the battery system 100 further includes general-purpose elements besides the elements shown in FIG. 1.

Figure 2:
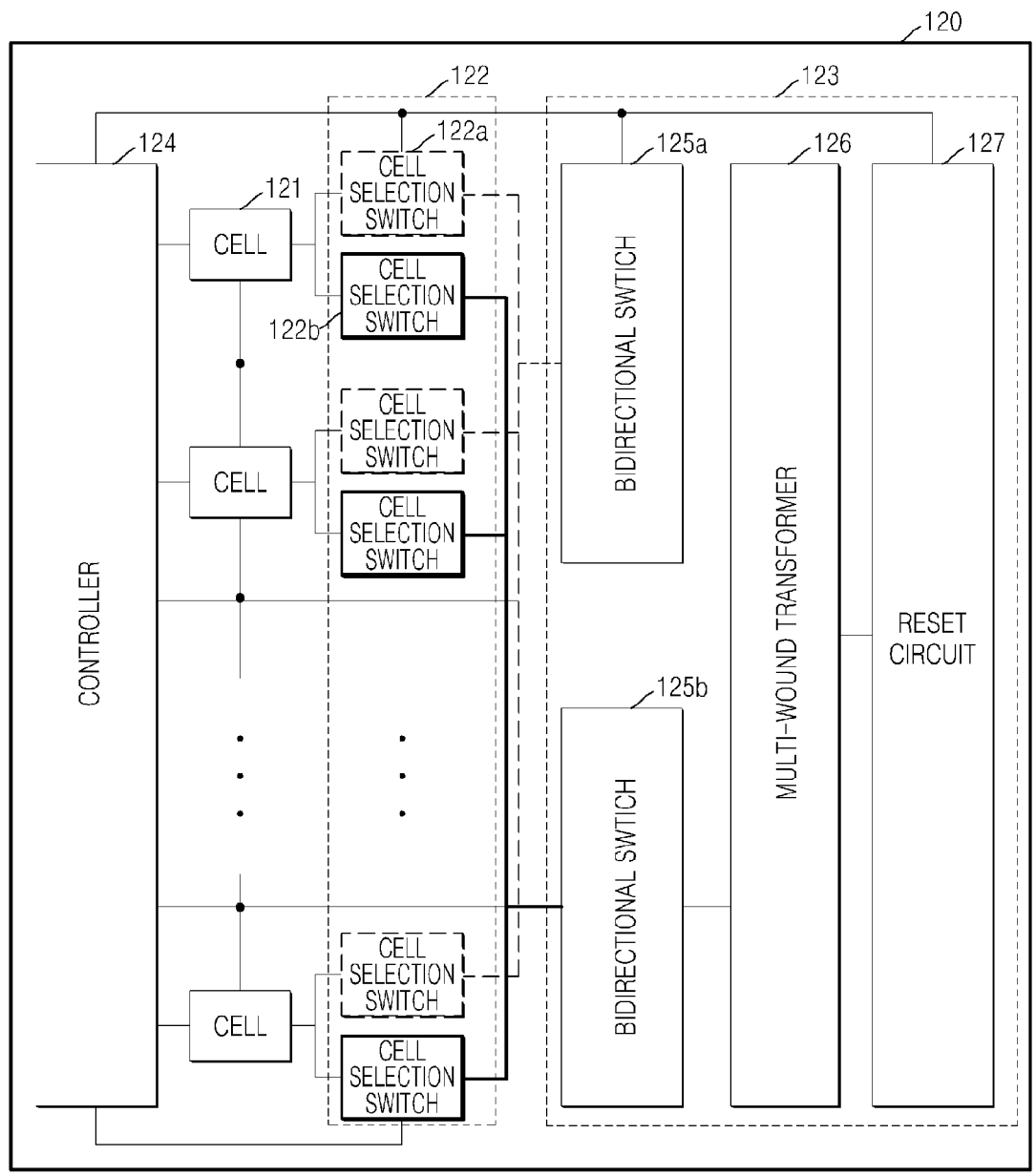
FIG. 2 illustrates an exemplary module according to some example embodiments of the present disclosure.

FIG. 2 illustrates an exemplary module 120 according to some example embodiments of the present disclosure.

Referring to FIG. 2, the module 120 includes a plurality of cells 121 connected in series, and a cell balancing circuit. Here, the cell balancing circuit includes a switching unit 122, a controller 124 and a balancing unit 123. The balancing unit 123 includes one or more forward converters, wherein each of the forward converters includes a bidirectional switch 125a or 125b, a multiple wound transformer 126, and a reset circuit 127. Hereinafter, the cell balancing circuit and the cell balancing apparatus are used in the same meaning.

The controller 124 may correspond to a single processor or a plurality of processors. The processor may be implemented by an array of a plurality of logic gates, or by a combination of a general-purpose microprocessor and a memory for storing a program executable in the microprocessor. Also, those having an ordinary skill in the art will understand that the processor may be implemented with other type of hardware.

The switching unit 122 may be formed of the first switching unit and the second switching unit. For example, the first switching unit may be formed of a combination of cell selection switches 122a represented as dashed lines in FIG. 2, and the second switching unit may be formed of a combination of cell selection switches 122b represented as thick solid lines 122b in FIG. 2.

A first switching unit may include the cell selection switches 122a respectively connected to the cells 121 included in the module 120, and connect a first cell (i.e., one of the cells 121) to the balancing unit 123. A second switching unit may include the cell selection switches 122b respectively connected to the cells 121 included in the module 120, and connect a second cell (i.e., a second one of the cells 121) to the balancing unit 123. Here, the first cell indicates a cell having a higher voltage, and the second cell indicates a cell having a lower voltage, between two cells on which the balancing is to be performed.

As shown in FIG. 2, ones of the cell selection switches 122a or 122b included in the first and second switching units may be respectively connected to each cell 121 in the module 120, and the others may be connected to the balancing unit 123. In addition, the cell selection switches 122a or 122b are individually turned on or off according to a control signal from the controller 124, and accordingly currents flowing between the cells 121 connected to the cell selection switches 122a or 122b and the balancing unit 123 are controlled.

The controller 124 measures the voltages of the cells, and controls operations of the first and second switching units and the balancing unit 123 on the basis of information on the first and second cells, which are selected by using the measured voltages.

In detail, the controller 124 measures each voltage of the cells 121 included in the module 120, and selects cells 121 to be balanced on the basis of the measured voltages. For example, the cells 121 to be balanced may be two cells 121 having the largest voltage difference between them. That is, the controller 124 may select the cell having the maximum voltage as the first cell, and the cell having the minimum voltage as the second cell, from among the cells 121 having measured voltages. The controller 124 may turn on or off the cell selection switches 122a or 122b respectively connected to the selected cells. The controller 124 controls the cell selection switches 122a or 122b respectively connected to the selected cells, for a single period.

When a cell balancing process starts, the controller 124 turns on the cell selection switches 122a or 122b respectively connected to the cells 121 (namely, the first and second cells) to be balanced, and then repeatedly turns on and turns off the bidirectional switches 125a and 125b included in the balancing unit 123 (specifically, the forward converters). In addition, when the cell balancing process ends, the controller 124 turns off the bidirectional switches 125a and 125b, and then turns off the cell selection switches 122a or 122b respectively connected to the balanced cells 121 (namely, the first and second cells).

The controller 124 may select cells 121 to be balanced on the basis of a preset priority. As described above, selecting cells having the maximum and minimum voltages may be an example of the priority. In other words, the controller may previously determine which cells are selected and have balancing performed on according to the preset priority on the basis of the measured voltages.

The balancing unit 123 is connected to the first and second switching units, and performs balancing between the first and second cells selected by the controller 124. For example, the forward converter included in the controller 124 may be designed such that resonance occurs by a capacitor included in the bidirectional switches 125a and 125b and an inductor included in the multiple wound transformer 126.

Hereinafter, the bidirectional switches 125a and 125b forming the forward converter included in the balancing unit 123, the multiple wound transformer 126, and the reset circuit 127 will be described.

The bidirectional switches 125a or 125b are respectively connected to the first and second switching units to control currents flowing between the first and second switching units and the multiple wound transformer 126. For example, one bidirectional switch 125a of the two bidirectional switches 125a and 125b may be connected to the first switching unit and the other bidirectional switch 125b may be connected to control currents flowing between the first and second switching units and the multiple wound transformer 126.

Under a certain condition, the current flowing through the bidirectional switches 125a or 125b flows in a direction from the cell 121 (for example, the first or second cell) connected to the cell selection switch 122a or 122b to the multiple wound transformer 126, or in a direction from the multiple wound transformer 126 to the cell 121 (for example, the first or second cell) connected to the cell selection switch 122a or 122b.

The multiple wound transformer 126 is connected to the bidirectional switches 125a and 125b, and transfers energy between the first and second cells. In detail, a mutual inductor of the multiple wound transformer 126 is connected to and correlated with the bidirectional switches 125a and 125b. Accordingly, through the mutual inductor connected to the bidirectional switches 125a and 125b, the first and second cells may transmit and receive energy to and from each other.

For example, the multiple wound transformer 126 may include two mutual inductors having the same number of windings.

Energy transfer from the first cell to the second cell is performed by the multiple wound transformer 126. Accordingly, since energy stored in any one cell is transferred to another cell without passing through an unnecessary circuit, energy transfer efficiency is high.

That is, the cell balancing apparatus may directly transfer energy stored in the first cell to the second cell, and directly receive energy from the cells 121 by using the bidirectional switches 125a or 125b, and multiple wound transformer 126.

The reset circuit 127 is connected to both ends of the module 120 and includes a mutual inductor (not shown) correlated with the multiple wound transformer 126 and a diode (not shown). In detail, the reset circuit 127 resets energy stored in the mutual inductor of the multiple wound transformer 126. The mutual inductor of the multiple wound transformer 126 stores a portion of the energy transferred in a process of transferring energy between the cells, and the reset circuit 127 receives the portion of the energy stored in the mutual inductor of the multiple wound transformer 126.

A detailed description regarding the balancing unit 123 included in the forward converter will be described later in relation to FIGS. 7 to 11.

Meanwhile, assuming that the number of the cells 121 included in the module 120 is N, the balancing unit 123 may include one or more, and N or less forward converters. That is, the balancing unit may include a smaller number of forward converters than the number of the cells 121, regardless of the number of cells 121 included in the module 120. As shown in FIG. 2, since the first and second cells may be selected to have balancing performed on by using the cell selection switches 122a and 122b included in the cell balancing circuit, cell balancing is possible regardless of the number of the cells 121.

Figure 3:
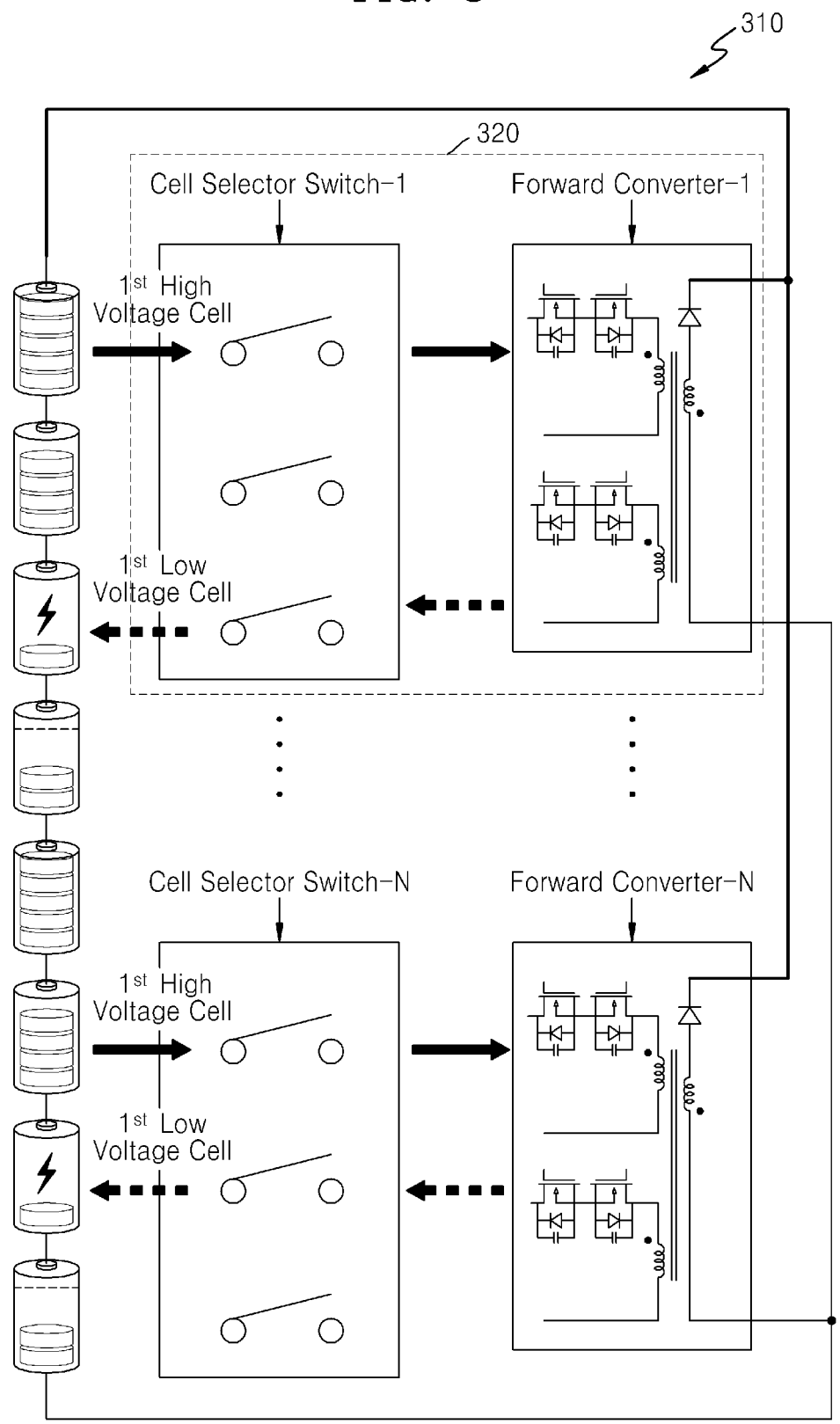
FIGS. 3 and 4 illustrate exemplary cell balancing apparatuses according to some example embodiments of the present disclosure.
Figure 4:
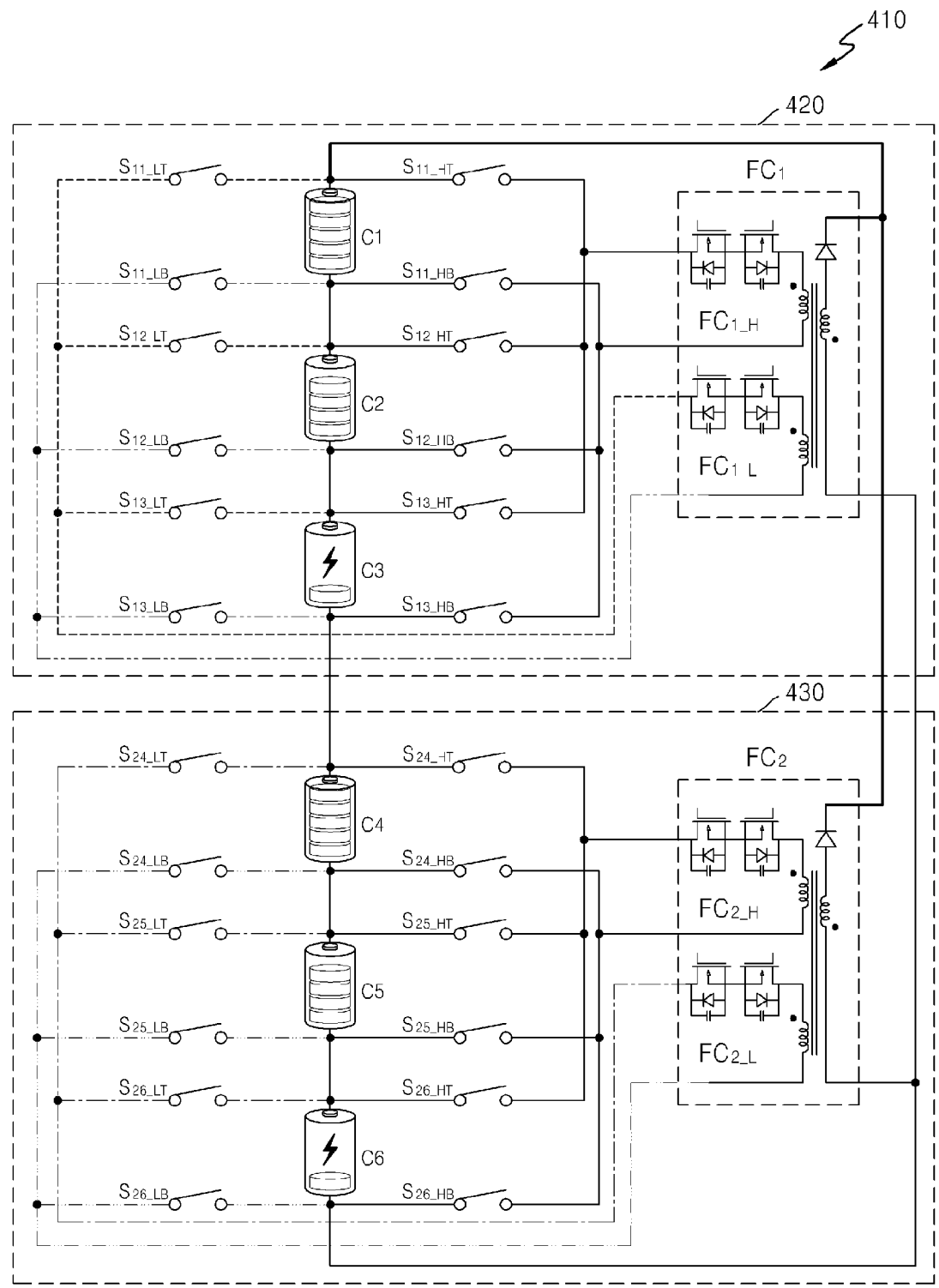

FIGS. 3 and 4 illustrate exemplary cell balancing apparatuses according to some example embodiments of the present disclosure.

FIG. 3 is a conceptual diagram illustrating an exemplary cell balancing apparatus according to some example embodiments of the present disclosure.

FIG. 3 shows a plurality of balancing sets 320 in which the plurality of cells connected in series in the module 310 are divided, and balancing is performed in parallel on the divided cells. Each of the balancing sets 320 includes the first and second switching units (cell selector switches in FIG. 3), a controller (not shown), and a balancing unit (forward converters in FIG. 3). Here, operations of the first and second switching units, the controller and the balancing unit are the same as the description regarding FIG. 2.

Each of the balancing sets 320 performs balancing on cells into which the plurality of cells connected in series and included in the module 310 are divided. For example, assuming that 100 cells and N balancing sets 320 are included in the module 310, each balancing set 320 takes 100/N cells and performs balancing on them. Also, each balancing set 320 may be connected to each other in parallel to form a single balancing apparatus, and may simultaneously perform cell balancing. As described above, since the plurality of cell balancing sets 320 simultaneously perform cell balancing, a balancing speed can be improved.

FIG. 4 is a circuit diagram illustrating an exemplary cell balancing apparatus according to some example embodiments of the present disclosure.

Referring to FIG. 4, the number of the cells (C1 to C6) included in the module 410 is 6 and the number of balancing sets 420 and 430 is 2 in total, but the number of each is not limited thereto. Hereinafter, an operation of the balancing circuit will be described in relation to one balancing set 420 of the two balancing sets 420 and 430 in FIG. 4.

For cell balancing of the cells C1 to C3, the balancing set 420 includes a first switching unit including cell selection switches S11_HT, S11_HB, . . . , S13_HT, S13_HB, second switching unit including cell selection switches S11_LT, S11_LB, . . . , S13_LT, S13_LB, a balancing unit including a single forward converter FC1, and a controller 124 in FIG. 2 for controlling the above elements. Here, the forward converter FC1 includes a reset circuit including a multiple wound transformer having two mutual inductors, two bidirectional switches FC1_H and FC1_L, and mutual inductors correlated with the multiple wound transformer, and a single diode.

The forward converter FC1 is designed to have resonance occur between a capacitance component included in the bidirectional switches FC1_H and FC1_L, and an inductor included in the multiple wound transformer. In addition, each of the bidirectional switches FC1_H and FC1_L has two synchronous rectifier (SR) n-channel metal-oxide-semiconductor (NMOS) field-effect transistor (MOSFETs) (SR-NMOSs) facing each other. Here, the SR-NMOS includes a built-in diode and the capacitance component.

The multiple wound transformer includes two mutual inductors, and the mutual inductors have the same polarity. The mutual inductors are correlated with each other and transfer cell energy.

The reset circuit is connected to both ends of cells C1 to C3 that are connected in series, and includes mutual inductors correlated with the mutual inductors of the multiple wound transformer, and a diode. The mutual inductors of the reset circuit are correlated with the mutual inductors of the multiple wound transformer, and have reverse polarities.

As a voltage between both ends of the mutual inductors of the multiple wound transformer increases, a voltage between both ends of the mutual inductors of the reset circuit increases. When a voltage of the mutual inductor of the multiple wound transformer is greater than the voltage between both ends of the total cells C1 to C3, a current flows into the reset circuit. When the current flows into the reset circuit, the voltage between both ends of the mutual inductor of the multiple wound transformer no longer increases and maintains a constant voltage. The mutual inductor of the reset circuit has a greater number of windings than that of the two mutual inductors forming the multiple wound transformer. By adjusting the numbers of windings of the two mutual inductors forming the multiple wound transformer and the mutual inductor of the reset circuit, a peak voltage between both ends of the bidirectional switch FC1_H or FC1_L may be adjusted.

The controller 124 in FIG. 2 measures voltage of each of the cells C1 to C3, and compares the measured voltages with one other. The controller 124 in FIG. 2 turns on the cell selection switches in order to connect cells having the highest voltage and the lowest voltage to the forward converter FC1.

For example, assuming that the cell C1 has the highest voltage, and the cell C3 has the lowest voltage, the controller 124 in FIG. 2 turns on the cell selection switches S11_HT and S11_HB connected to cell C1, and the cell selection switches S13_LT and S13_LB connected to cell C3, and turns off the cell selection switch connected to cell C2. At this time, the bidirectional switch FC1_H or FC1_L included in the forward converter FC1 maintains an off state such that a balancing current does not flow. Accordingly, the power consumption due to the cell selection switches S11_HT, S11_HB, . . . , S13_LT, and S13_LB does not occur. Thereafter, the controller 124 in FIG. 2 transmits a pulse width modulation (PWM) signal (e.g., a signal repeating turning-on and turning-off) to the bidirectional switch FC1_H or FC1_L and performs cell balancing. Here, an operation of the forward converter FC1 will be described later in relation to FIGS. 7 to 11.

When the cell balancing process is completed, the controller 124 in FIG. 2 turns off the bidirectional switch FC1_H or FC1_L included in the forward converter FC1, and confirms that the current does not flow. Then, the controller 124 in FIG. 2 turns off the cell selection switches S11_HT and S11_HB connected to cell C1, and the cell selection switches S13_LT and S13_LB connected to cell C3. Accordingly, power consumption via the cell selection switches S11_HT, S11_HB, . . . , S13_LT, and S13_LB does not occur.

In the same scheme as described above, the balancing set 430 included in the module 410 performs cell balancing. Like this, since the balancing sets 420 and 430 simultaneously perform cell balancing, the balancing speed can be improved without unnecessary energy consumption.

Figure 5:
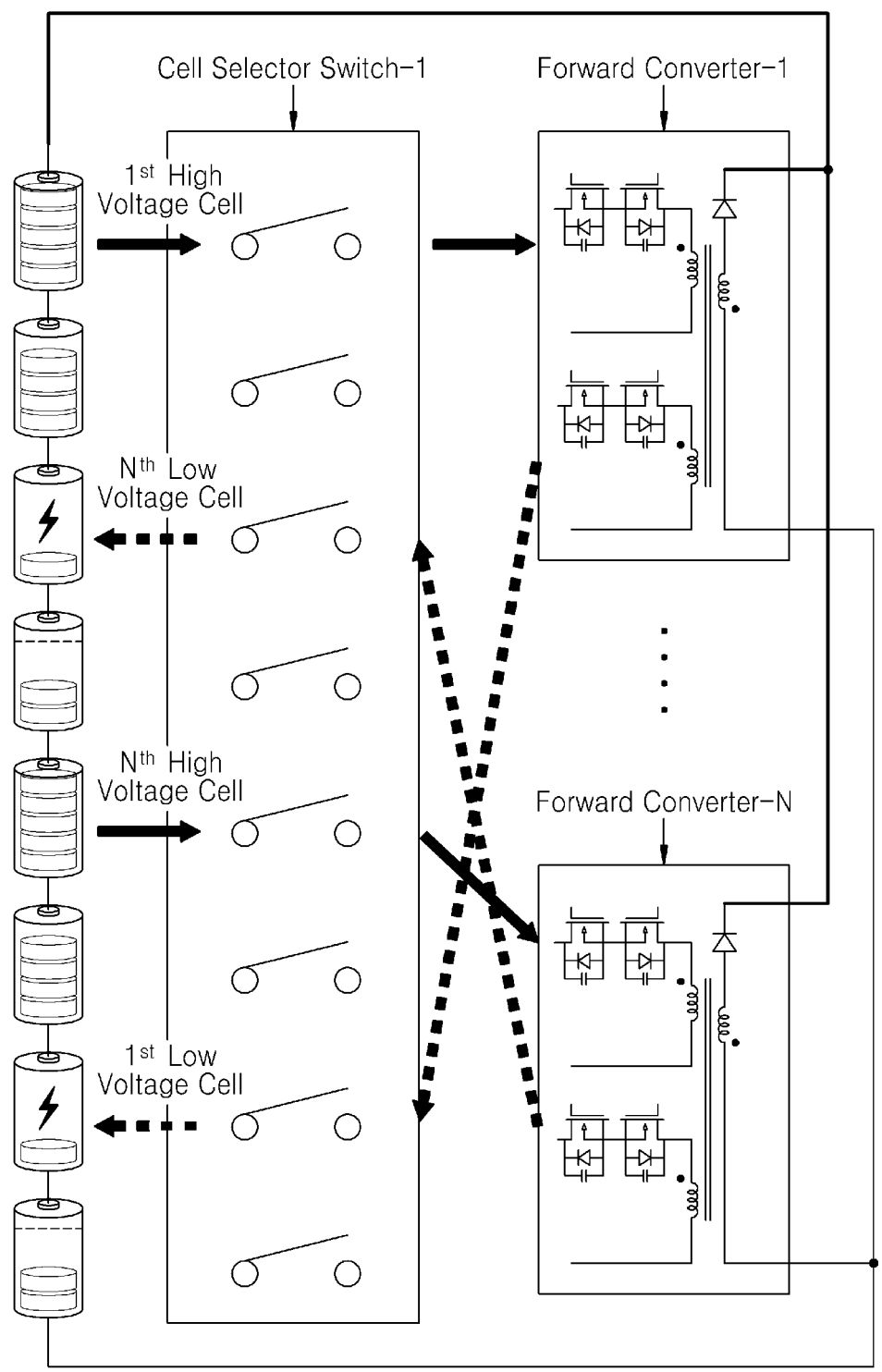
FIGS. 5 and 6 illustrates other exemplary cell balancing apparatuses according to some example embodiments of the present disclosure.
Figure 6:
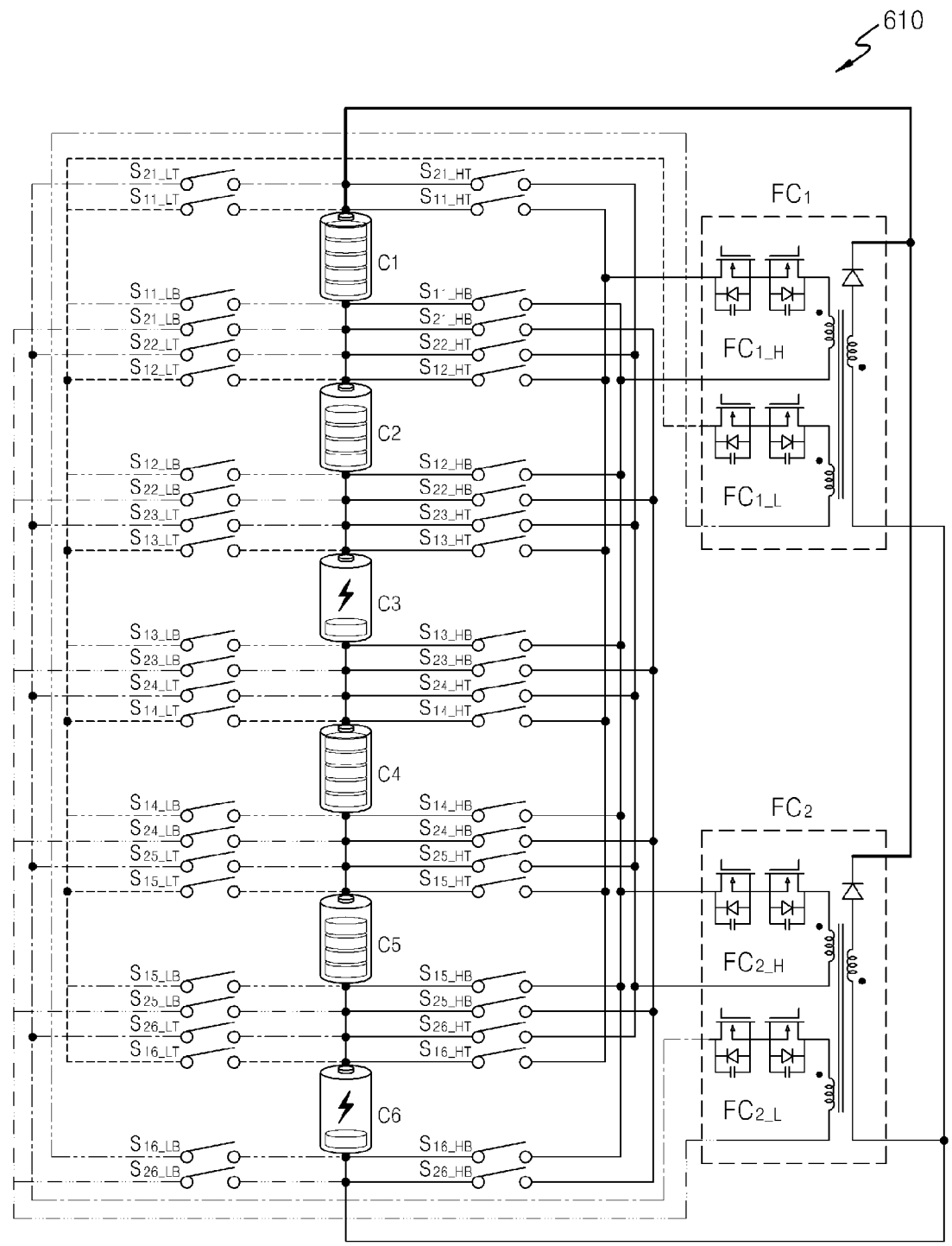

FIGS. 5 and 6 illustrate other exemplary cell balancing apparatuses according to some example embodiments of the present disclosure.

FIG. 5 is a conceptual diagram illustrating anther exemplary cell balancing apparatus according to some example embodiments of the present disclosure.

FIG. 5 shows a plurality of forward converters included in a balancing unit 123 in FIG. 2, as a single module 510. For example, assuming that the number of forward converters is N, the forward converters are connected in parallel, and the cell balancing is performed in an order based on voltages of the cells included in the module 510.

For example, a first forward converter may perform balancing between a cell having the highest voltage and a cell having the lowest voltage, and a K-th forward converter may perform balancing between a cell having a K-th highest voltage and a cell having a K-th lowest voltage. Here, N is an integer of 2 or greater and the number of cells included in the module 510 or smaller, and K is an integer of 2 or greater and N or smaller. Like this, since the plurality of forward converters simultaneously perform cell balancing in an order based on voltages of the cells, efficiency of the balancing circuit can be improved.

FIG. 6 is a circuit diagram illustrating another exemplary cell balancing apparatus according to some example embodiments of the present disclosure.

Referring to FIG. 6, the number of the cells C1 to C6 included in the module 610 is 6 in total and the number of forward converters FC1 and FC2 is 2 in total, but the number of each is not limited thereto. Here, a configuration and connection positions of cell selection switches S11_HT, S11_HB, . . . , S26_LT, S26_LB connected to each cell, and forward converters FC1 and FC2 are similar to the description in relation to FIG. 4.

The controller 124 of FIG. 2 measures voltages of total cells C1 to C6, and compares the measured voltages with each other. Also, the controller 124 of FIG. 2 turns on the cell selection switches S11_HT, S11_HB, . . . , S26_LT, and S26_LB to connect cells having the highest and lowest voltages to forward converter FC1, and connect cells having a second highest and a second lowest voltages to forward converter FC2.

For example, assuming that the cell C1 has the highest voltage, the cell C4 has the second highest voltage, the cell C6 has the lowest voltage, and the cell C3 has the second lowest voltage, the controller (124 in FIG. 2) turns on the cell selection switches S11_HT and S11_HB connected to cell C1, the cell selection switches S24_HT and S24_HB connected to cell C4, the cell selection switches S16_LT and S16_LB connected to cell C6, and the cell selection switches S23_LT and S23_LB connected to cell C3, and turns off the cell selection switches connected to the remaining cells C2 and C5. At this time, the bidirectional switches FC1_H, FC1_L, FC2_H, and FC2_L included in the forward converters FC1 and FC2 maintain an off state and the balancing current does not flow. Accordingly, power consumption via the cell selection switches S11_HT, S11_HB, . . . , S26_LT, and S26_LB does not occur. Thereafter, the controller 124 in FIG. 2 transmits a PWM signal (e.g., a signal for repeatedly turning-on and turning-off a switch) to the bidirectional switches FC1_H, FC1_L, FC2_H, and FC2_L and performs cell balancing. Here, operation of the forward converter FC1 or FC2 will be described later in relation to FIGS. 7 to 11.

When the cell balancing process is completed, the controller 124 in FIG. 2 turns off the bidirectional switches FC1_H, FC1_L, FC2_H, and FC2_L included in the forward converters FC1 and FC2, and confirms that the current does not flow. Then, the controller 124 in FIG. 2 turns off the cell selection switches S11_HT and S11_HB connected to cell C1, and the cell selection switches S24_HT and S24_HB connected to cell C4, the cell selection switches S16_LT and S16_LB connected to cell C6, and the cell selection switches S23_LT and S23_LB connected to cell C3. Accordingly, power consumption via the cell selection switches S11_HT, S11_HB, . . . , S26_LT, and S26_LB does not occur.

As described above, since the plurality of forward converters FC1 and FC2 simultaneously perform cell balancing in an order based on voltages, efficiency of the balancing circuit can be improved without unnecessary energy consumption.

FIGS. 7 to 10 are circuit diagrams illustrating an operation of a forward converter according to some example embodiments of the present invention.

Figure 7:
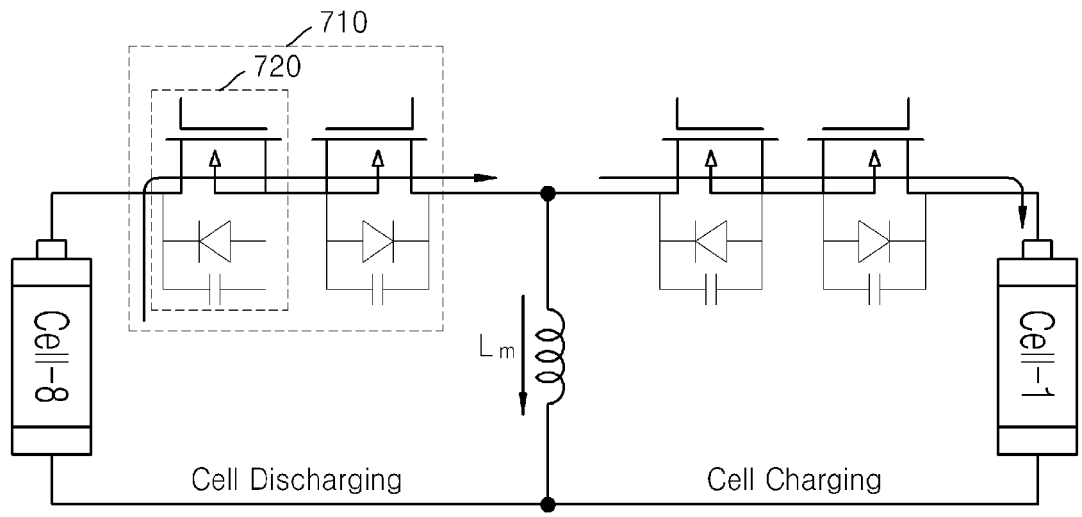
FIG. 7 illustrates a case of on states of bidirectional switches connected to two cells, according to some example embodiments of the present disclosure.

In detail, FIGS. 7 to 10 illustrate an operation of a forward converter according to an on/off state of the bidirectional switches 710 in FIG. 7 connected to two cells Cell-1 and Cell-8 selected by the controller 124 of FIG. 2. Although not shown in FIGS. 7 to 10, it is assumed that cell selection switches 122a or 122b in FIG. 2 connected to each of Cell-1 and Cell-8 are turned on. That is, FIGS. 7 to 10 illustrate an operation of a forward converter according to on/off states of the bidirectional switches 710 in FIG. 7 connected to the turned on cell selection switches 122a or 122b in FIG. 2, when the cell selection switches 122a or 122b in FIG. 2 connected to each of Cell-1 and Cell-8 are turned on. Accordingly, "bidirectional switches connected to two cells Cell-1 and Cell-8" has the same meaning as "bidirectional switches connected to cell selection switches that are respectively connected to two cells Cell-1 and Cell-8", as described below.

Also, in FIGS. 7 to 10, it is assumed that Cell-8 is a cell having a high voltage and Cell-1 is a cell having a low voltage. Therefore, energy in Cell-8 is transferred to Cell-1.

FIG. 7 illustrates a case where bidirectional switches 710 connected to two cells Cell-1 and Cell-8 are in an on state (i.e., the bidirectional switches 710 are closed) according to some example embodiments of the present disclosure.

When the bidirectional switch 710 connected to the two cells Cell-1 and Cell-8 is closed by the controller 124 in FIG. 2, the two cells Cell-1 and Cell-8 form a circuit as shown in FIG. 7. In detail, a current flows from Cell-8 having a high voltage to a mutual inductor Lm and Cell-1. Accordingly, Cell-8 gets discharged, Cell-1 gets charged, and the mutual inductor Lm stores energy. Therefore, a voltage difference between the two cells Cell-1 and Cell-8 is reduced, and the two cells Cell-1 and Cell-8 have the same voltage. At this time, in order for most of the energy in Cell-8 to be transferred to Cell-1, impedance of the mutual inductor Lm is designed to be larger than impedance of a cell.

In addition, since the bidirectional switches 710 are implemented by using two SR-NMOSs 720, and when the bidirectional switches 710 are in an on state, a current flows through only a resistor resulting from an on state of the SR-NMOS 720, without passing through a built-in diode. Accordingly, a voltage drop due to a conduction loss and the built-in diode is reduced.

Figure 8:
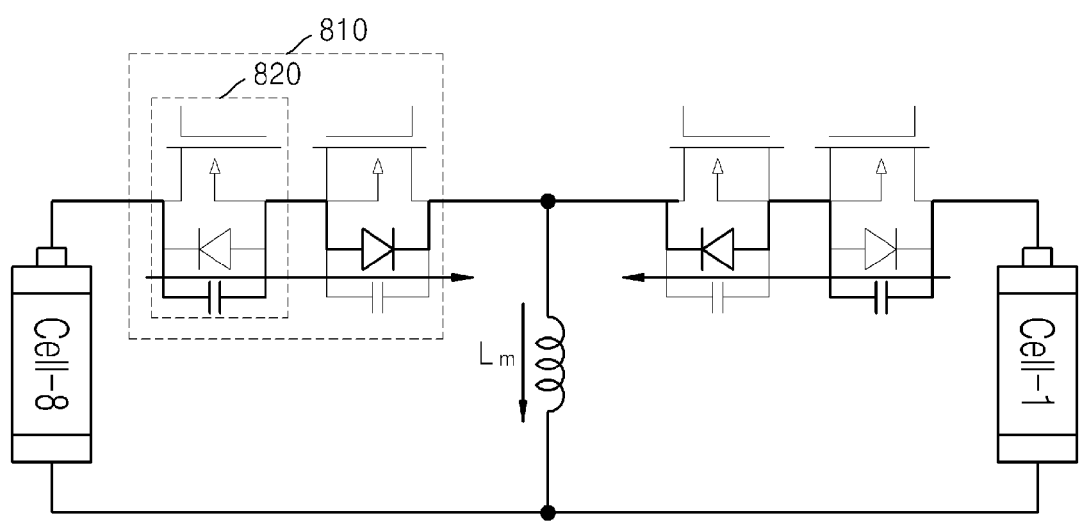
FIG. 8 is a circuit diagram illustrating open states of bidirectional switches connected to two cells according to some example embodiments of the present disclosure.
Figure 9:
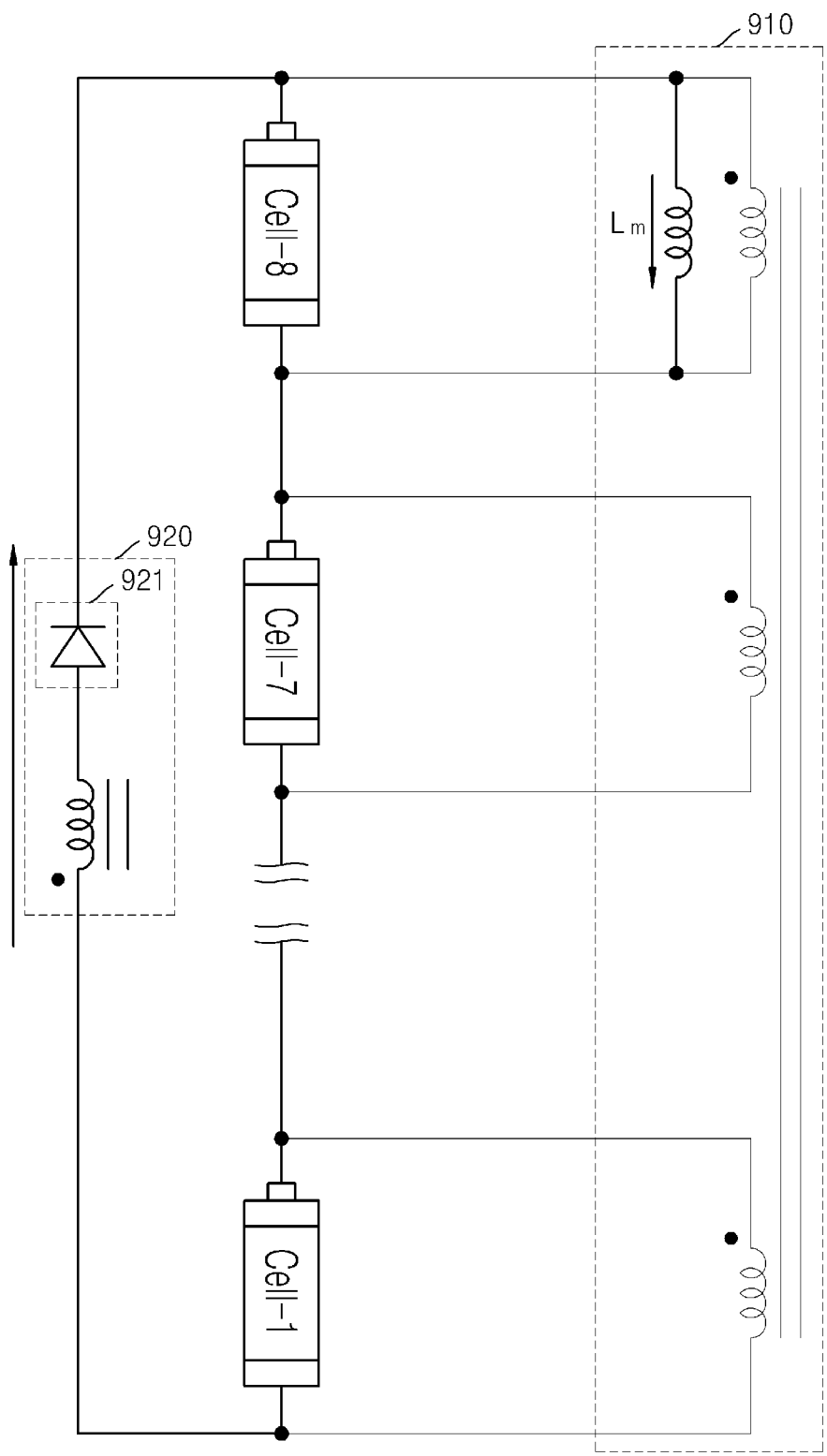
FIG. 9 is a circuit diagram illustrating a process of resetting energy stored in a mutual inductor Lm of a multiple wound transformer in open states of bidirectional switches connected to two cells, according to some example embodiments of the present disclosure.
Figure 10:
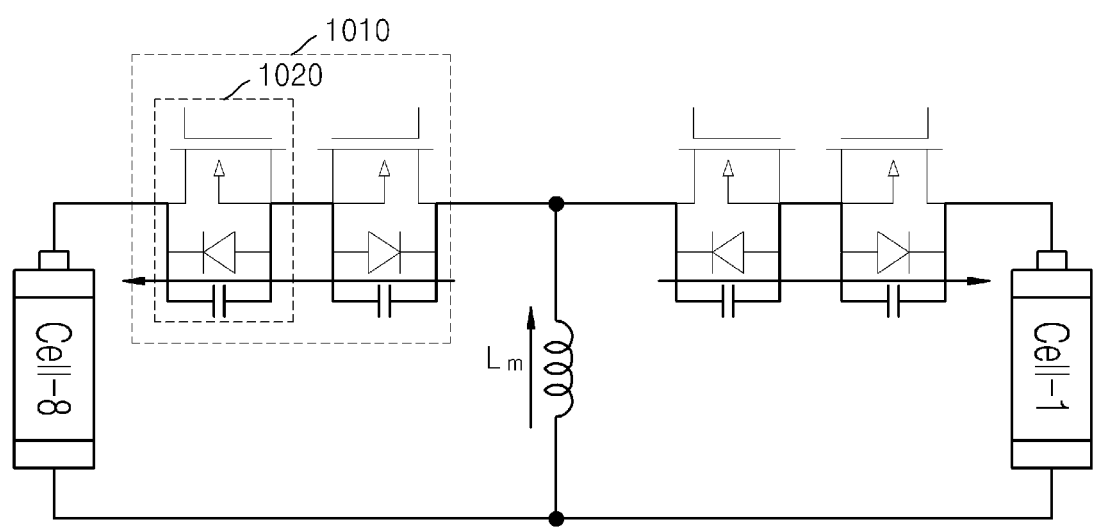
FIG. 10 is a circuit diagram illustrating a case where a current no longer flows through a reset circuit in open states of bidirectional switches connected to two cells according to some example embodiments of the present disclosure.

FIGS. 8 to 10 illustrate a case where bidirectional switches 810 of two cells Cell-1 and Cell-8 in FIG. 8 are in an off state.

FIG. 8 is a circuit diagram illustrating a case where the bidirectional switches 810 of two cells Cell-1 and Cell-8 in FIG. 8 are in an off state.

When the bidirectional switches 810 of the two cells Cell-1 and Cell-8 are in the off state, an output capacitor of an SR-NMOS 820 and a mutual inductor Lm forms a resonance circuit. Accordingly, a voltage between both ends of each of the bidirectional switches 810 does not increase rapidly, but increases gradually in a sinusoidal wave form. At this time, some energy is stored in the mutual inductor Lm, a current flowing through the bidirectional switches 810 is gradually reduced to 0, and a voltage of the bidirectional switches 810 gradually increases (zero-voltage switching turn-off).

FIG. 9 is a circuit diagram illustrating a process of resetting energy stored in a mutual inductor Lm of a multiple wound transformer 910, when bidirectional switches of two cells Cell-1 and Cell-8 are turned off, according to some example embodiments of the present disclosure.

In FIG. 9, for the convenience of description, the bidirectional switches 810 connected to two cells Cell-1 and Cell-8 are not shown.

Referring to FIG. 9, as energy stored in the mutual inductor Lm increases, a voltage of the mutual inductor Lm increases. As a voltage of a mutual inductor Lm of a multiple wound transformer 910 increases, a voltage of a mutual inductor of a reset circuit 920 that is correlated with the voltage of the mutual inductor Lm of the multiple wound transformer 910 also increases. When the voltage of the mutual inductor of the reset circuit 920 increases to be larger than a voltage (namely, a voltage of both ends of all cells connected in series) of both ends of the module 120, a current flows into the reset circuit 920 through a diode 921. Accordingly, a voltage of the mutual inductor Lm of the multiple wound transformer 910 no longer increases, the voltage of the bidirectional switch (810 of FIG. 8) does not increase, and a voltage across the bidirectional switch (810 of FIG. 8) reaches a peak voltage. At this time, a polarity of the mutual inductor of the reset circuit 920 is opposite to a polarity of the mutual inductor Lm of the multiple wound transformer 910.

FIG. 10 is a circuit diagram illustrating a case where a current no longer flows through the reset circuit (920 of FIG. 9), when bidirectional switches 1010 of two cells Cell-1 and Cell-8 are turned off, according to some example embodiments of the present disclosure.

If a current no longer flows through the reset circuit (920 in FIG. 9), an output capacitor of an SR-NMOS 1020 and a mutual inductor Lm form a resonance circuit. Accordingly, values of the output capacitor and the mutual inductor Lm are adjusted so that a voltage of the bidirectional switch 1010 gradually reduces, and becomes zero just when the bidirectional switch 1010 is turned on again (zero voltage switching (ZVS) turn-on).

Figure 11:
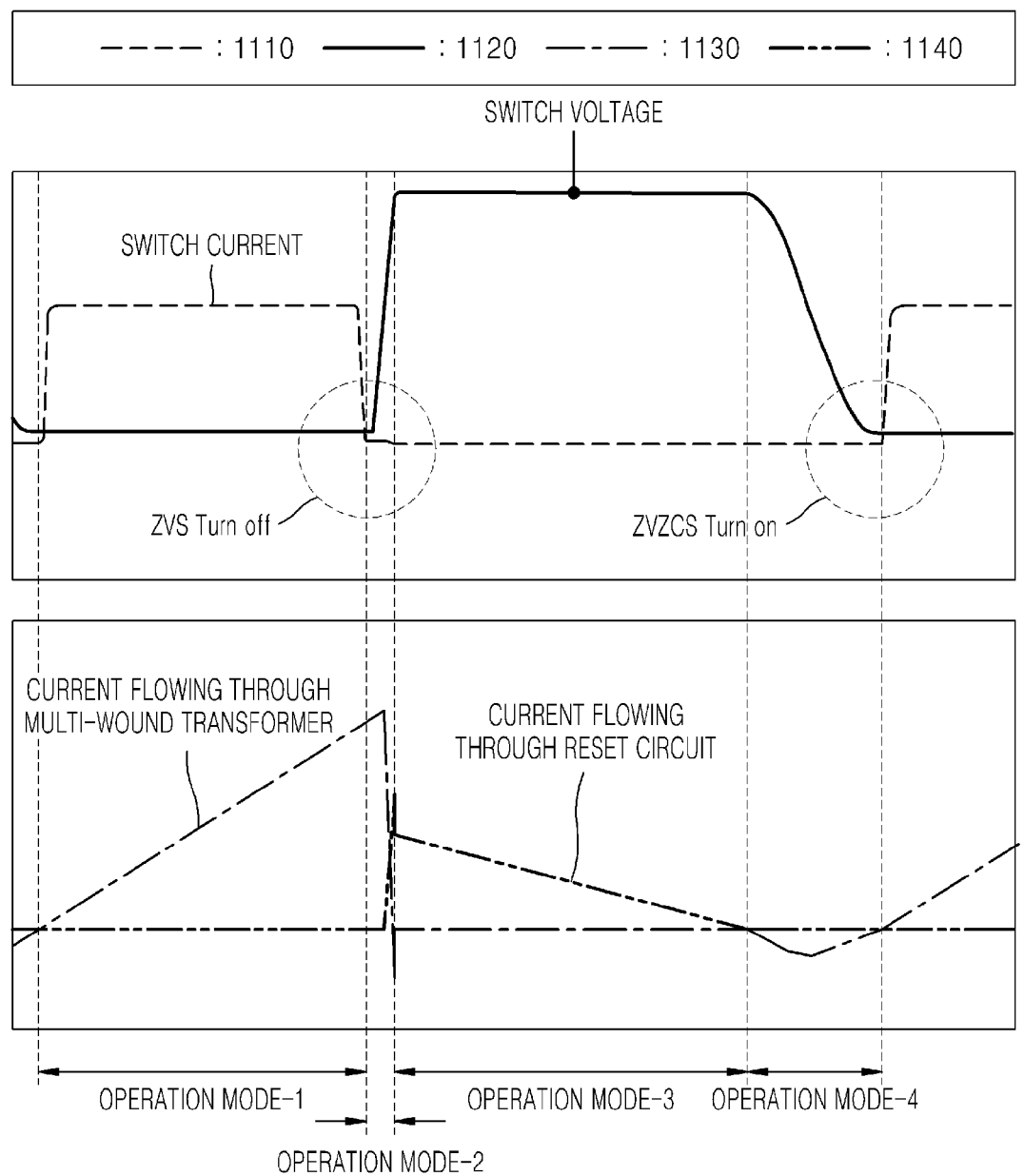
FIG. 11 is a graph illustrating an operation of a forward converter shown in FIGS. 7 to 10 according to some example embodiments of the present disclosure.

FIG. 11 is a graph illustrating an operation of a forward converter shown in FIGS. 7 to 10.

Even though detailed description is omitted, description on the forward converters in relation to FIGS. 7 to 10 is also applied to FIG. 11. Operation mode-1 represents an operation of the forward converter in FIG. 7, operation mode-2 represents an operation of the forward converter in FIG. 8, operation mode-3 represents an operation of the forward converter in FIG. 9, and operation mode-4 represents an operation of the forward converter in FIG. 10.

Operation mode-1 represents an operation of the forward converter when bidirectional switch 710 in FIG. 7 is in on state. In operation mode-1, a switch current 1110 is increased from zero and then maintained to be a constant value, and a switch voltage 1120 is maintained to be zero in an on state of the bidirectional switch 710 in FIG. 7. A current 1130 flowing through the multiple wound transformer 910 in FIG. 9 increases constantly, and there is no current 1140 flowing through the reset circuit 920 in FIG. 9. The switch current 1110 decreases to zero before the bidirectional switch 710 in FIG. 7 is turned off. The switch current 1110 represents a current flowing through the bidirectional switch 710 in FIG. 7.

Operation mode-2 represents an operation of the forward converter immediately after the bidirectional switch 810 in FIG. 8 is turned off. In operation mode-2, the switch current 1110 becomes zero before the bidirectional switch 810 in FIG. 8 is turned off, and the switch current 1110 is maintained to be zero in an off state of the bidirectional switch 810 of FIG. 8. The switch voltage 1120 increases when the bidirectional switch 810 in FIG. 8 is turned off, and has a peak voltage. The current 1130 flowing through the multiple wound transformer 910 in FIG. 9 increases, and the current 1140 flowing through the reset circuit 920 in FIG. 9 remains at a zero state.

Operation mode-3 represents an operation of the forward converter when a voltage of the mutual inductor of the reset circuit 920 in FIG. 9 is larger than a voltage between both ends of the module 120 in FIG. 1. In operation mode-3, the switch current 1110 remains at zero state, the switch voltage 1120 is maintained at the peak voltage. The current 1130 flowing through the multiple wound transformer 910 in FIG. 9 remains at a zero state when a current begins to flow into the reset circuit 920 in FIG. 9. The current 1140 flowing through the reset circuit 920 in FIG. 9 is increased and then gradually decreased.

Operation mode-4 represents an operation of the forward converter when a current no longer flows through the reset circuit 920 in FIG. 9. In operation mode-4, the switch current 1110 remains at a zero state, the switch voltage 1120 gradually decreases to a zero state (zero voltage zero current switching (ZVZCS) turn-on) before the bidirectional switch 1010 in FIG. 10 is turned on again. The current 1130 flowing through the multiple wound transformer (910 in FIG. 9) flows in a reverse direction to that in operation mode-1, and becomes a zero state before the bidirectional switch (1010 in FIG. 10) is turned on again. The current 1140 flowing through the reset circuit (920 in FIG. 9) remains at a zero state.

The cell balancing apparatus measures voltages of cells at every period, and closes switches of the selected cells for a constant time period. Accordingly, in order to operate as shown in FIG. 11, the cell balancing apparatus is designed on the basis of times when the bidirectional switch 125a or 125b in FIG. 2 is opened and closed. In detail, an output capacitor and a mutual inductor included in the cell balancing apparatus are designed in consideration of a period of measuring voltages and a time for the selected switch being closed.

As described above, according to the one or more of the above embodiments of the present invention, since energy is directly transferred from a high voltage cell to a low voltage cell without passing through a module in cell balancing, energy transfer efficiency is high. Since soft-switching of a switch is enabled, an efficiency of a circuit forming a balancing apparatus is also high. In addition, since a plurality of converters connected in parallel in an identical module simultaneously operate, a balancing speed is high. Since a forward transformer having triple windings is employed regardless of the number of cells, it is easy to design the transformer, and a volume of a circuit forming a balancing apparatus is reduced.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An apparatus for performing balancing on a plurality of cells connected in series and included in a module, the apparatus comprising:
   a first switching unit including first cell selection switches respectively connected to cells of the plurality of cells, and configured to connect a first cell to be balanced to a balancing unit;
   a second switching unit including second cell selection switches respectively connected to cells of the plurality of cells, and configured to connect a second cell to be balanced to the balancing unit;
   a controller configured to measure voltages of each of the plurality of cells, and controlling operations of the first switching unit, the second switching unit, and the balancing unit based on information on the first and second cells, wherein the first and second cells are selected by the controller by using the measured voltages; and
   the balancing unit, connected to the first switching unit and the second switching unit, and configured to perform balancing between the first cell and the second cell that are selected by the controller;
   wherein the balancing unit comprises at least one forward converter which includes bidirectional switches configured to control currents flowing between the first switching unit, the second switching unit, and multiple wound transformers, and
   wherein a capacitor included in one of the bidirectional switches and an inductor included in one of the multiple wound transformers are configured to have a voltage between both ends of the one of the bidirectional switches or a current flowing through the one of the bidirectional switches having a minimum value when the one of the bidirectional switches is turned on or off.

2. The apparatus according to claim 1, wherein a number of the plurality of cells is N, and the balancing unit includes at least one but no more than N forward converters.

3. The apparatus according to claim 2, wherein the bidirectional switches are connected to the first switching unit and the second switching unit, and
   wherein each of the forward converters comprises:
      the multiple wound transformers connected to the bidirectional switches, and configured to transfer the energy between the first cell and the second cell; and
      a reset circuit connected to both ends of the module, and including a mutual inductor correlated with the multiple wound transformers and a diode.

4. The apparatus according to claim 1, wherein each of the multiple wound transformers comprises two mutual inductors having a same number of windings.

5. The apparatus according to claim 1, wherein each of the at least one forward converters is configured to allow the capacitor included in the one of the bidirectional switches and the inductor included in the one of the multiple wound transformers to form resonance.

6. The apparatus according to claim 1, wherein the first cell and the second cell respectively have highest and lowest voltages from among the plurality of cells.

7. The apparatus according to claim 1, wherein the controller is configured to control the first switching unit, the second switching unit, and the balancing unit to turn on the first and second cell selection switches respectively connected to the first and second cells and, then, repeatedly turn on and turn off the bidirectional switches in the balancing unit so as to perform the balancing, and to turn off the first and second cell selection switches respectively connected to the first and second cells after turning off the bidirectional switches so as to complete the balancing.

8. The apparatus according to claim 1, wherein when the balancing unit comprises M forward converters, the M forward converters are connected in parallel, a first forward converter performs the balancing between a cell having a highest voltage and a cell having a lowest voltage of the plurality of cells, and a K-th forward converter performs the balancing between a cell having a K-th highest voltage and a cell having a K-th lowest voltage of the plurality of cells, where M is an integer greater than or equal to 2 but no more than a number of the plurality of cells, and K is an integer greater than or equal to 2 and less than or equal to M.

9. An apparatus for performing balancing on a plurality of cells connected in series and included in a module, the apparatus comprising:
   two or more balancing sets performing the balancing in parallel on cells in groups of cells into which the plurality of cells are divided;
   wherein each of the two or more balancing sets comprises:
      a first switching unit including first cell selection switches respectively connected to cells included in a first group of cells, and configured to connect a first cell to be balanced, from the first group of cells, to a balancing unit;
      a second switching unit including second cell selection switches respectively connected to cells included in a second group of cells, and configured to connect a second cell to be balanced, from the second group of cells, to the balancing unit;
      a controller configured to measure voltages of each of the cells in the first and second groups of cells, and configured to control operations of the first switching unit, the second switching unit, and the balancing unit based on information on the first and second cells, wherein the first and second cells are selected by the controller by using the measured voltages; and
      the balancing unit, connected to the first and second switching units, and configured to perform balancing between the first and second cells that are selected by the controller; and
   wherein the balancing unit comprises at least one forward converter which includes bidirectional switches configured to control currents flowing between the first switching unit, the second switching unit, and multiple wound transformers, and
   wherein a capacitor included in one of the bidirectional switches and an inductor included in one of the multiple wound transformers are configured to have a voltage between both ends of the one of the bidirectional switches or a current flowing through the one of the bidirectional switches having a minimum value when the one of the bidirectional switches is turned on or off.

10. The apparatus according to claim 9, wherein a number of the cells in each group of cells connected to each of the balancing sets is N, and the balancing unit comprises one or more forward converters and N or fewer forward converters.

11. The apparatus according to claim 10, wherein the bidirectional switches are connected to the first switching unit and the second switching unit, and wherein each of the forward converters comprises:
the multiple wound transformers connected to the bidirectional switches, and configured to transfer the energy between the first cell and the second cell; and
a reset circuit connected to both ends of the module, and including a mutual inductor correlated with the multiple wound transformers and a diode.

12. The apparatus according to claim 9, wherein the multiple wound transformers comprise two mutual inductors having a same number of windings.

13. The apparatus according to claim 9, wherein each of the at least one forward converters is configured to allow the capacitor included in the one of the bidirectional switches and the inductor included in the one of the multiple wound transformers to form resonance.

14. The apparatus according to claim 9, wherein the first cell and the second cell respectively have highest and lowest voltages from among the plurality of cells.

15. The apparatus according to claim 9, wherein the controller is configured to control the first switching unit, the second switching unit, and the balancing unit to turn on the first and second cell selection switches and, then, repeatedly turn on and turn off the bidirectional switches in the balancing unit so as to perform the balancing, and to turn off the first and second cell selection switches after turning off the bidirectional switches so as to complete the balancing.

16. A battery module, comprising:
a plurality of cells connected in series; and
a balancing apparatus selecting any two cells from among the plurality of cells, and balancing the selected cells;
wherein the balancing apparatus comprises:
a first switching unit including first cell selection switches respectively connected to cells of the plurality of cells, and configured to connect a first cell to be balanced to a balancing unit;
a second switching unit including second cell selection switches respectively connected to cells of the plurality of cells, and configured to connect a second cell to be balanced to the balancing unit;
a controller configured to measure voltages of each of the plurality of cells, and configured to control operations of the first switching unit, the second switching unit, and the balancing unit based on information on the first cell and the second cell, wherein the first cell and the second cell are selected by the controller by using the measured voltages; and
the balancing unit, connected to the first switching unit and the second switching unit, and configured to perform balancing between the first cell and the second cell that are selected by the controller; and
wherein the balancing unit comprises at least one forward converter which includes bidirectional switches configured to control currents flowing between the first switching unit, the second switching unit, and multiple wound transformers, and
wherein a capacitor included in one of the bidirectional switches and an inductor included in one of the multiple wound transformers are configured to have a voltage between both ends of the one of the bidirectional switches or a current flowing through the one of the bidirectional switches having a minimum value when the one of the bidirectional switches is turned on or off.

17. The battery module according to claim 16, wherein when the balancing unit comprises M forward converters, the M forward converters are connected in parallel, a first forward converter performs the balancing between a cell having a highest voltage and a cell having a lowest voltage of the plurality of cells, and a K-th forward converter performs the balancing between a cell having a K-th highest voltage and a cell having a K-th lowest voltage of the plurality of cells, where M is an integer greater than or equal to 2 and less than or equal to a number of the plurality of cells, and K is an integer greater than or equal to 2 and less than or equal to M.

* * * * *